Nov. 23, 1965     I. L. JOY     3,218,845
ULTRASONIC FLAW TESTING APPARATUS
Filed Oct. 26, 1960     2 Sheets-Sheet 1
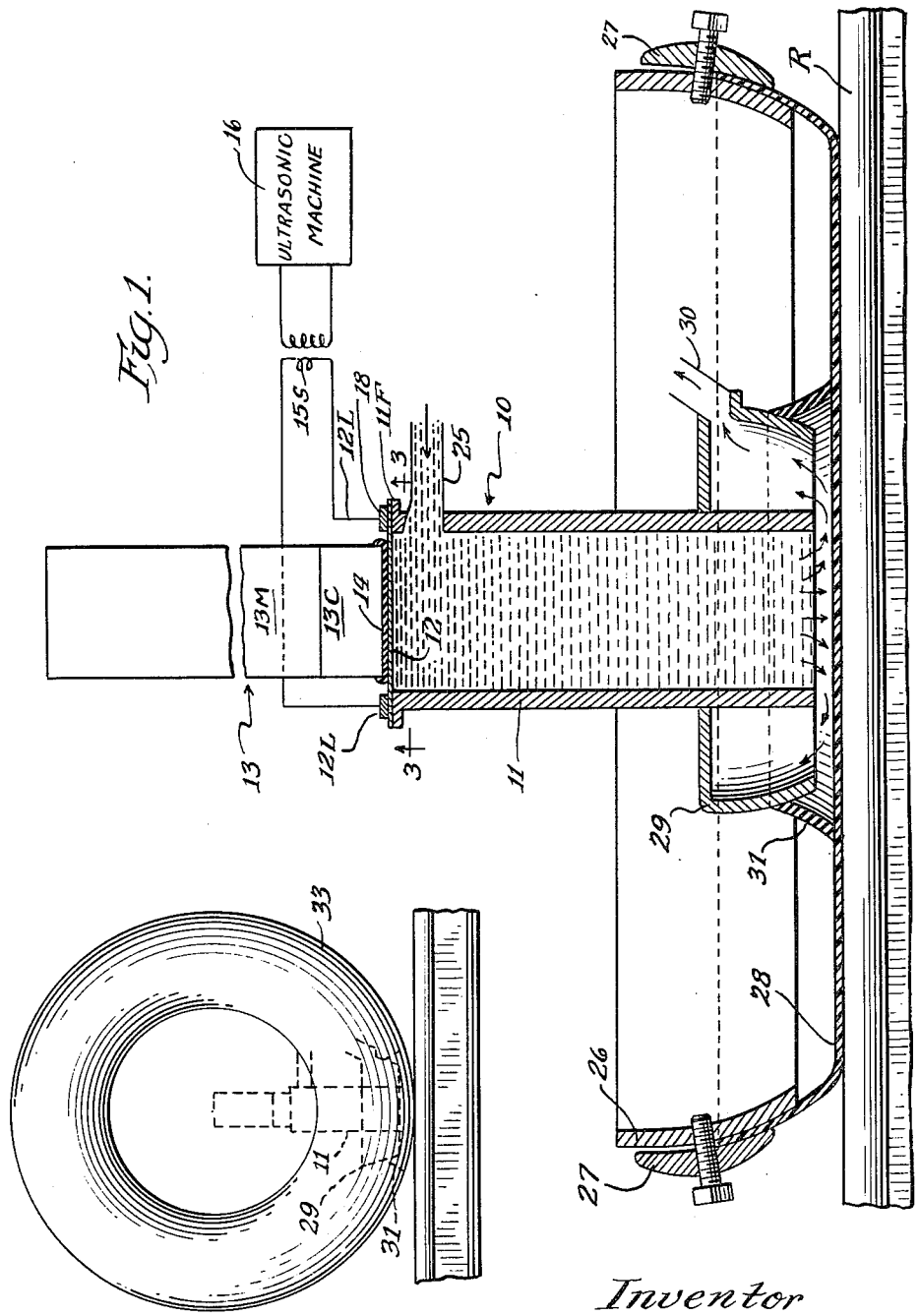
Inventor
Ivan L. Joy.
By Mann, Brown & McWilliams
Attys.

Nov. 23, 1965   I. L. JOY   3,218,845
ULTRASONIC FLAW TESTING APPARATUS
Filed Oct. 26, 1960   2 Sheets-Sheet 2
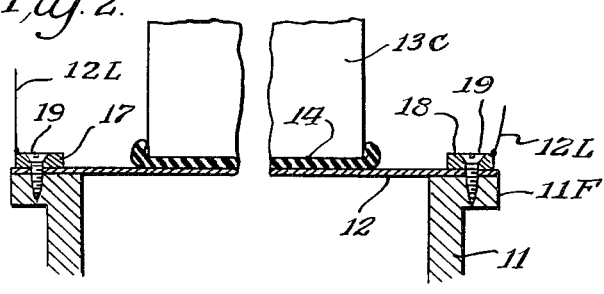
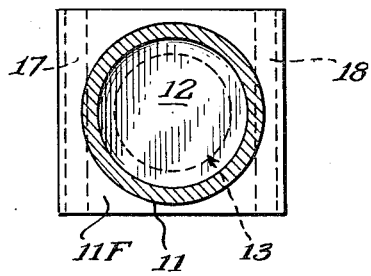
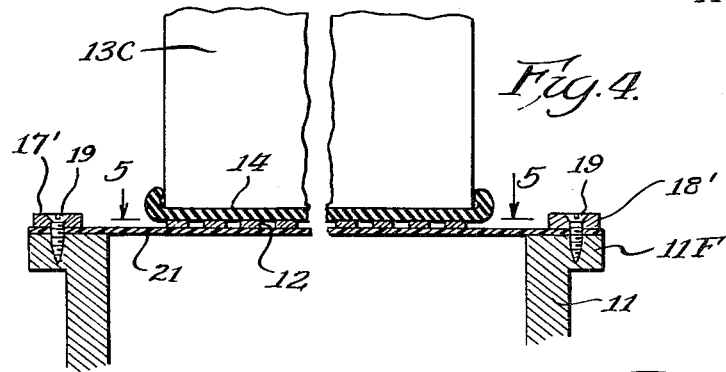
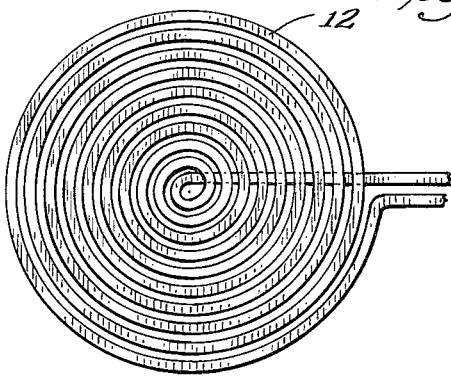
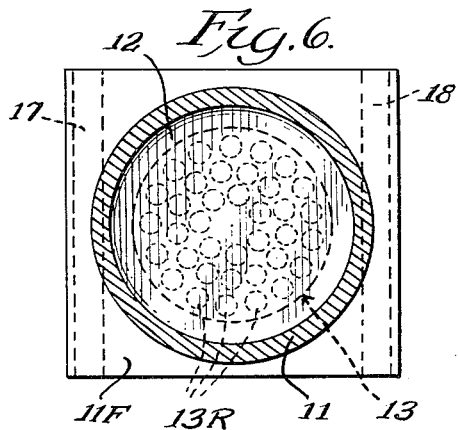
Inventor
Ivan L. Joy.
By Mann, Brown & McWilliams.
Attys.

United States Patent Office 3,218,845
Patented Nov. 23, 1965

3,218,845
ULTRASONIC INSPECTION METHOD FOR
INACCESSIBLE PIPE AND TUBING
Daniel C. Worlton, Richland, Wash., assignor to the United States of America as represented by the United States Atomic Energy Commission
Filed July 9, 1962, Ser. No. 208,655
2 Claims. (Cl. 73—67.8)

This invention relates to methods of nondestructive testing and more particularly to methods using Lamb waves to detect subsurface flaws in metal pipe. The invention described herein was made in the course of, or under, a contract with the United States Atomic Energy Commission.

Conventional ultrasonic inspection of metal pipe is accomplished using a water coupling medium between a transducer and the metal pipe. The metal pipe is immersed in the water and complete inspection is accomplished by rotating the pipe as the transducer is moved along the longitudinal axis thereof. In some cases, inspection is made using a "shoe" as the coupling medium between the transducer and the pipe; the shoe being moved circumferentially around the pipe and along the longitudinal axis thereof to accomplish complete inspection. Where, however, the tubes are installed and there is only limited access to the surface thereof, the above described techniques are inoperable.

It is therefore one object of the present invention to provide a method for nondestructively detecting subsurface flaws in a metal pipe wherein only a limited portion of said pipe is available for testing.

It is another object of the present invention to provide a method using Lamb waves for detecting flaws in a metal pipe wherein only a small portion of said pipe is available for testing.

It is another object of the present invention to provide a method for detecting flaws in a metal pipe using Lamb waves which travel the length of said pipe in a helical pattern.

Other objects of the present invention will become more apparent as the detailed description proceeds.

In general, the present invention comprises generating ultrasonic plane waves and causing them to impinge on the surface of a metal pipe at a predetermined angle of incidence in a first plane passing through the longitudinal axis of the pipe. The ultrasonic waves are also caused to impinge on the surface of the pipe at an angle of incidence in a second plane passing through the longitudinal axis of the pipe normal to said first plane. The ultrasonic waves cause Lamb waves to be excited in the pipe and flow therealong in a helical pattern. Any flaws in the pipe cause reflections of the Lamb waves, which reflections return along the helical pattern to be detected and thereby denote the presence of flaws in the pipe.

Further understanding of the present invention will best be obtained from consideration of the accompanying drawings in which:

FIG. 1 is a graphical representation of Lamb wave modes in stainless steel plate as a function of phase velocity versus the product of frequency and thickness of the plate.

FIG. 2 is a sketch illustrating the method of propagation of the Lamb waves for the present invention.

FIG. 3 is a top view of the sketch of FIG. 2.

When an ultrasonic wave impinges on a metal plate, an infinite number of Lamb wave modes may be generated within the plate depending upon the material of the plate, the thickness of the plate and the frequency of the ultrasonic wave. Each Lamb wave mode is propagated with a unique phase velocity that is related to the product of the frequency of the ultrasonic wave and of thickness of the plate. FIG. 1 illustrates this relationship for stainless steel plate. In FIG. 1, curves 10, 12, 14, 16, 18 and 20 are plots of the 1st, 2nd, 3rd, 4th, 5th and 6th asymmetrical modes respectively. Thus, where the thickness of the plate is $d_1$ and an ultrasonic wave of frequency $f_1$ is applied to the plate, the product $f_1 d_1$ will permit the excitation of the first, second or third Lamb wave modes in the plate. The corresponding phase velocities of the excited Lamb waves will be $V_1$, $V_2$ or $V_3$ as shown in FIG. 1.

The point of contact between a plane wave front and the plate runs along the surface of the plate with a velocity V which is equal to $V_w/\sin \theta$, where $V_w$ is the velocity of the ultrasound in the coupling medium and $\theta$ is the angle of incidence of the ultrasonic wave. When $\theta$ is chosen so that the surface velocity V is equal to the phase velocity of a particular Lamb wave mode then that particular mode will be excited in the plate provided that the frequency times thickness therefor is correct. The above described method of Lamb wave mode propagation in a metal plate may be directly applied to metal pipe. That is, the curvature of the pipe does not appreciably alter the behavior of mode propagation from that of plate geometries.

Turning to FIGURES 2 and 3, a transducer 22 is mounted on a wedge-shaped shoe 24, which in turn is mounted on the surface of a metal pipe 26. The shoe 24 is composed of some suitable ultrasonic coupling medium such as plastic. The shape of the shoe 24 is cut at an angle $\theta$ with respect to the surface of the pipe 26 so that ultrasonic plane waves emanating from transducer 22 will impinge on the surface of the metal pipe 26 to excite a particular Lamb wave mode therein in accordance with the curves illustrated in FIG. 1. The particular mode to be established within the pipe 26 depends upon the application. For example, suppose that it is desirable that the second asymmetrical mode be excited in a stainless steel pipe whose wall thickness is $3/8''$. First, a test frequency is chosen according to defect, resolution requirements, and wave attenuation characteristics. For purposes of illustration, assume an ultrasonic wave propagation frequency of 2.5 megacycles. FIG. 1 shows that the second asymmetrical mode of this frequency will propagate in the chosen pipe at a phase velocity of $2.75 \times 10^5$ inches per second. The transducer wedge angle $\theta$ is computed from the prior described equation, $$\sin \theta = \frac{V_w}{2.75 \times 10^5}$$

The plastic shoe 24 has a $V_w$ value of about $0.9 \times 10^5$ inches per second. $\theta$, therefore, would be 19 degrees.

By rotating the transducer 22 through an angle $\beta$ with respect to the longitudinal axis of the pipe 26, the ultrasonic waves emanating from transducer 22 will be caused to impinge on the surface of the pipe 26 at a similar angle $\beta$ with respect to the longitudinal axis of the pipe 26. This angle $\beta$ gives a transverse direction to the Lamb waves thereby causing them to travel down the pipe in a helical pattern as shown. The greater the angle $\beta$ the smaller the pitch of the helices and, in general, the smaller the pitch the greater the resolution to small defects. However, there is a practical limitation as to how small the pitch may be, since the smaller the pitch the less the longitudinal travel.

As the Lamb waves travel down the pipe 26 in a helical path, they may, in the absence of flaws in the pipe 26, do one of two things. If the pipe 26 has a small enough length, the Lamb waves will reach the end of the pipe 26 whereupon they will be reflected back along the same helical path as they have previously traveled and will be detected by transducer 22. If the pipe is infinitely long the Lamb waves will be attenuated and no reflected signal will be received. If a flaw exists in the pipe 26, it will cause the Lamb waves to be reflected, which reflections will travel back along the helical pattern and will be detected by transducer 22. Thus, flaws in the pipe 26 may be detected by the time difference in reflected signals detected by transducer 22 where the length of pipe 26 is short and by the presence of reflected signals where the pipe 26 is long. The actual recognition of these signals may be accomplished by commercially available equipment such as a Reflectorscope manufactured by Sperry Products, Inc.

Complete scanning of the pipe may be accomplished simply by (a) varying the angle $\beta$ of the transducer 22, or (b) moving the transducer 22 back and forth slightly along the longitudinal axis of the pipe 26 while maintaining the angle $\beta$ constant, or (c) mounting several transducers in a row.

Persons skilled in the art will, of course, readily adapt the teachings of the invention to methods far different from the methods herein described. Accordingly, the scope of the protection afforded the invention should not be limited to the particular methods described and shown above but should be determined only in accordance with the appended claims.

What is claimed is:

1. A method of detecting flaws in a metal pipe comprising spatially mounting a transducer at a predetermined angle with respect to the surface of said pipe in a first plane passing through the longitudinal axis thereof, interposing a coupling medium between said transducer and said pipe, positioning said transducer at an angle with respect to the longitudinal axis of said pipe in a second plane passing through said longitudinal axis normal to said first plane, moving said transducer back and forth a short distance along the longitudinal axis of said pipe while holding the angular position of said transducer constant, exciting said transducer to generate ultrasonic plane waves therefrom, said ultrasonic waves impinging on the surface of said pipe and causing Lamb waves to be excited therein which travel along said pipe in a helical path, said flaws in said pipe causing reflections of said Lamb waves, and detecting said reflected waves, thereby detecting the presence of flaws in said pipe.

2. A method of detecting flaws in a metal pipe comprising spatially mounting a transducer at a predetermined angle with respect to the surface of said pipe in a first plane passing through the longitudinal axis thereof, interposing a coupling medium between said transducer and said pipe, positioning said transducer at an angle with respect to the longitudinal axis of said pipe in a second plane passing through said longitudinal axis normal to said first plane, varying the angle of the transducer with respect to the longitudinal axis in said second plane, exciting said transducer to generate ultrasonic plane waves therefrom, said ultrasonic waves impinging on the surface of said pipe and causing Lamb waves to be excited therein which travel along said pipe in a helical path, said flaws in said pipe causing reflections of said Lamb waves, and detecting said reflected waves, thereby detecting the presence of flaws in said pipe.

References Cited by the Examiner

UNITED STATES PATENTS 2,536,128   1/1951   Firestone et al. _____ 73—67.8

FOREIGN PATENTS 756,906   1/1957   Great Britain.

OTHER REFERENCES

McMasters: Nondestructive Testing Handbook, Section 45, pages 12–13 and Section 47, pages 26–28, published 1959 by the Ronald Press Company of New York.

RICHARD C. QUEISSER, *Primary Examiner.*

JOHN P. BEAUCHAMP, *Examiner.*